Figure 6:
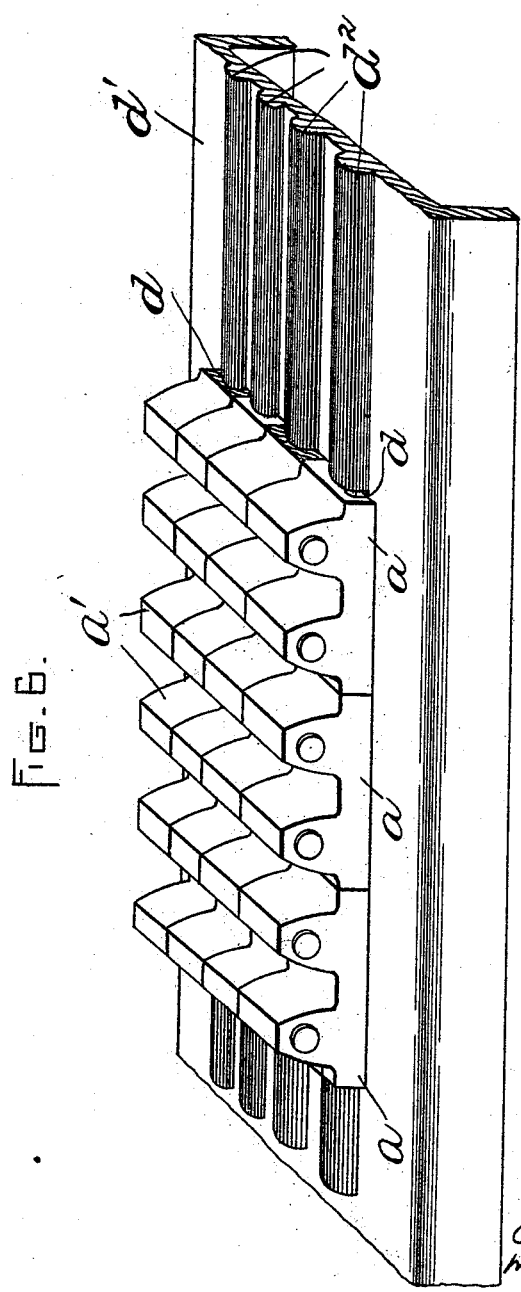

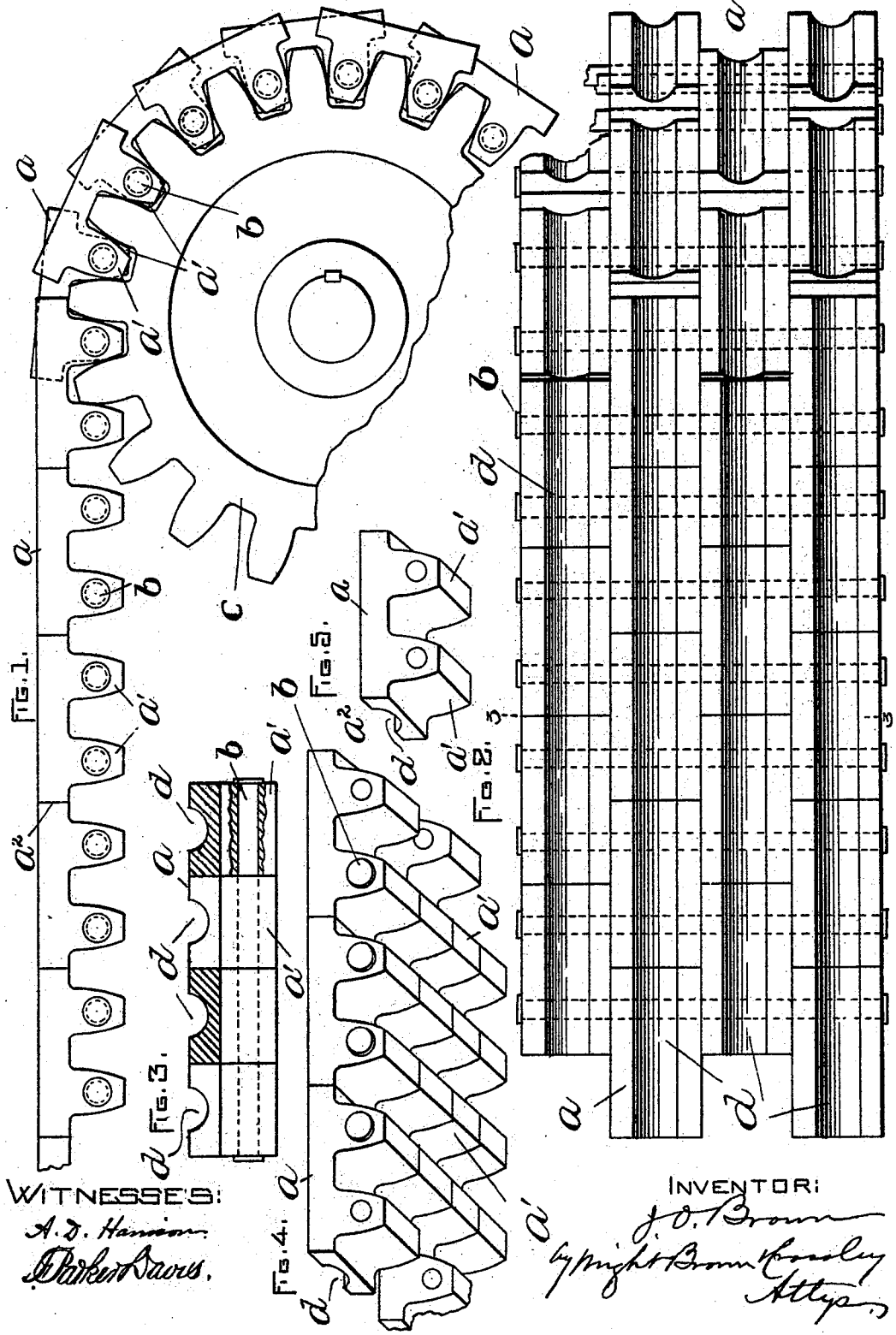

(No Model.) 2 Sheets—Sheet 2.

J. O. BROWN.
DRIVE CHAIN.

No. 525,254. Patented Aug. 28, 1894.

WITNESSES:
A. D. Harrison
Parker Davis

INVENTOR:
J. O. Brown
by Wright Brown Quinby
Atty.

UNITED STATES PATENT OFFICE.

JAMES O. BROWN, OF BOSTON, MASSACHUSETTS, ASSIGNOR TO THE NATIONAL CHAIN GEAR COMPANY, OF SAME PLACE.

DRIVE-CHAIN.

SPECIFICATION forming part of Letters Patent No. 525,254, dated August 28, 1894.

Application filed May 19, 1893. Renewed July 27, 1894. Serial No. 518,714. (No model.)

*To all whom it may concern:*

Be it known that I, JAMES O. BROWN, of Boston, in the county of Suffolk and State of Massachusetts, have invented certain new and useful Improvements in Drive-Chains, of which the following is a specification.

The object of this invention is to provide an improved construction of gear-chain, for connecting a driving and a driven gear-wheel, which shall be productive of increased effectiveness in the transmission of power, by reason of a gripping of each tooth of a gear-wheel by the teeth of the drive-chain while the latter is passing around the wheel, whereby lost motion between the wheel and chain is obviated.

To this end, the invention may be said to consist in a gear-chain composed of a plurality of rows of links, each link having gear-teeth on the inner side, the links of each row breaking joints with those of the adjacent row, and suitable connections between adjacent rows and the gear teeth of the different rows being in transverse alignment of links.

The accompanying drawings illustrate a construction by which the invention may be carried out.

Figure 1 shows a side elevation of a portion of a gear-chain constructed in accordance with my invention and represented as engaging a gear-wheel. Fig. 2 shows a top plan view of the chain, in the adjustment shown in Fig. 1. Fig. 3 shows a section on line 3—3 of Fig. 2, a tooth of one link being broken out to disclose the pintle. Fig. 4 shows a perspective view of a portion of the chain, looking toward the inner side of the same. Fig. 5 shows a perspective view of one of the links of which the chain is composed. Fig. 6 shows a perspective view of a portion of the lower stretch of the chain and guide therefor.

The same letters of reference indicate the same parts in all the figures.

Each link of the chain consists of a flat rectangular portion $a$, having a pair of gear-teeth $a'$ formed on its inner side. The ends of the link are square, as shown at $a^2$, and a row of links is formed by fitting them together end to end, so that they present a continuous series of equidistant gear-teeth, and a straight stretch of the chain between two gear-wheels has the rigidity of a rack in an inward direction by reason of the engagement of the square ends $a^2$. A plurality of rows of links thus made up are arranged side by side, so that the links of each row break joint with those of the adjacent row, as clearly shown in Fig. 2, and each transverse series of gear-teeth are in alignment, as shown in Fig. 4, whereby all the teeth in a transverse series may simultaneously enter into engagement with a tooth of a gear-wheel.

A pintle $b$ extends through each transverse series of teeth $a'$, and thus pivotally connects the links of each row with those of the adjacent row, and the links of each row constitute means of connection between the links of the adjacent row.

The action of a chain of the above-described construction in conjunction with a gear-wheel is best illustrated in Fig. 1, where the chain is represented as passing around a gear-wheel $c$. This gear-wheel is of ordinary construction, and has sufficient width to permit its teeth to interlock with all the teeth of the chain. As a link is deflected from the plane of its straight stretch, by reason of its engagement with the gear-wheel, the consequent movement of the rearward tooth of said link causes it to press against the tooth of the gear-wheel in front of which it has entered, and said tooth of the gear-wheel to be pinched or gripped between said rearward tooth of the chain-link and the forward tooth of the following link. This grip on the tooth is maintained until the links leave the chain and straighten into the lower stretch. The teeth of the chain consecutively grip the teeth of the wheel in this way. The teeth of one row of links of the chain can only grip alternate teeth of the wheel, as a tooth of the wheel between the two teeth of a single link will not be gripped by them, for they have no movement relative to each other. The links of the adjacent row, however, break joint with the links of the first-named row, as hereinbefore stated, and the gripping takes place in this row as well as in the said first-named row, and hence the teeth of the wheel not gripped by the teeth of the first row of links will be gripped by the teeth of the adjacent row. It will thus be seen that every tooth of the wheel is gripped by the chain while it passes around the wheel, and hence the chain cannot slip, and all lost motion is obviated.

The pintles $b$ preferably pass through the teeth without the plane of the flat portions of the links, so as to permit free separation of the square ends or shoulders $a^2$ of the links when the chain bends to pass around the wheel.

With this construction of chain, the links of one row connect those of another row, and no auxiliary connecting means are necessary, and neither is any special construction of wheel required.

Means are provided to guide and support the lower stretch of the chain, in order to prevent sagging thereof and lateral displacement of the chain. The backs of the links are provided with longitudinal grooves $d$, and a support $d'$ has a fixed position under the lower stretch of the chain and is provided with longitudinally-extending ribs $d^2$, which engage the grooves $d$ in the links. The lower stretch of the chain is held straight by the support $d'$, and lateral displacement of the chain is prevented by the engagement of the ribs $d^2$ with the grooves $d$.

Having thus described my invention, what I claim as new, and desire to secure by Letters Patent, is—

1. A gear-chain, composed of a plurality of rows of links, each link having gear-teeth on the inner side, the links of each row breaking joint with those of the adjacent row, and the gear-teeth of the different rows being in transverse alignment and suitable connections between adjacent rows of links.

2. A gear-chain, composed of a plurality of rows of links, each link having gear-teeth on the inner side and the links of each row breaking joint with those of the adjacent row, and pintles connecting the links of one row with those of the adjacent row whereby a link of one row serves as a means of connection between two links of the adjacent row.

3. The combination of a gear-chain whose links are provided with longitudinal grooves in their rear sides, with a support having ribs which engage said grooves, substantially as and for the purpose described.

In testimony whereof I have signed my name to this specification, in the presence of two subscribing witnesses, this 12th day of May, A. D. 1893.

JAMES O. BROWN.

Witnesses:
A. D. HARRISON,
F. PARKER DAVIS.